United States Patent [19]

Posséme

[11] Patent Number: 4,470,013
[45] Date of Patent: Sep. 4, 1984

[54] METHOD AND APPARATUS FOR POSITIONING A BOAT BY MONITORING THE MAGNETIC FIELD CREATED BY CURRENT CIRCULATING IN AN ELECTRIC CIRCUIT

[75] Inventor: Gilles Posséme, Paris, France
[73] Assignee: Thomson-CSF, Paris, France
[21] Appl. No.: 339,628
[22] Filed: Jan. 15, 1982

[30] Foreign Application Priority Data

Jan. 16, 1981 [FR] France ............... 81 00779

[51] Int. Cl.³ ............ G01B 7/14; G01R 33/02; G01R 19/15; B63H 25/00
[52] U.S. Cl. ............... 324/207; 114/144 R; 324/67; 324/247; 364/432
[58] Field of Search ............. 324/326, 329, 345, 207, 324/208, 232, 233, 244, 247, 67; 318/588; 364/424, 432, 443, 449; 114/114 R, 144 RE, 144 A, 144 B

[56] References Cited

U.S. PATENT DOCUMENTS

| | | |
|---|---|---|
| 2,731,598 | 1/1956 | Herbert ............... 324/52 |
| 3,991,363 | 11/1976 | Lathrop ............... 324/67 X |
| 4,075,553 | 2/1978 | Bouverot et al. ............... 324/233 |
| 4,112,349 | 9/1978 | Weber ............... 324/326 |
| 4,118,662 | 10/1978 | Weber ............... 324/326 |
| 4,263,552 | 4/1981 | Weber ............... 324/326 |

Primary Examiner—Gerard R. Strecker
Attorney, Agent, or Firm—Oblon, Fisher, Spivak, McClelland & Maier

[57] ABSTRACT

Device for positioning a moving body in a plane indicated by the axes OX and OY by using a magnetic field. A current i, which is the sum of a current $i_o$ at frequency $f_o$ in which $f_o \simeq 100$ Hz and a current $i_1$ at frequency $f_1$ in which $f_1 \simeq 10$ kHz modulated by bursts of recurring pulses having a period $T_o$ with $T_o = 1/f_o$ flows through a conductor. The moving body carries two pairs of magnetometers supplying the components of the magnetic field $h_x^o$, $h_y^o$ and $h_x^1$, $h_y^1$ with respect to axes associated with the moving body about frequencies $f_o$ and $f_1$. A subassembly, on the basis of the values of $h_x^o$ and $h_y^o$, supplies a signal $U_1$ of frequency $2f_o$. A subassembly, on the basis of the signal $U_1$, supplies two signals $S_1$ and $S_2$ displaced by $T_o/2$. Another subassembly supplies signals T on the basis of the values of $h_x^1$ and $h_y^1$, which are compared with the signals $S_1$ and $S_2$ for supplying a signal S on the basis of signal $U_1$. Signal S makes it possible to demodulate the components $h_x^o$ and $h_y^o$, which are thus obtained with their signs, determining without ambiguity the position of the moving body.

12 Claims, 5 Drawing Figures

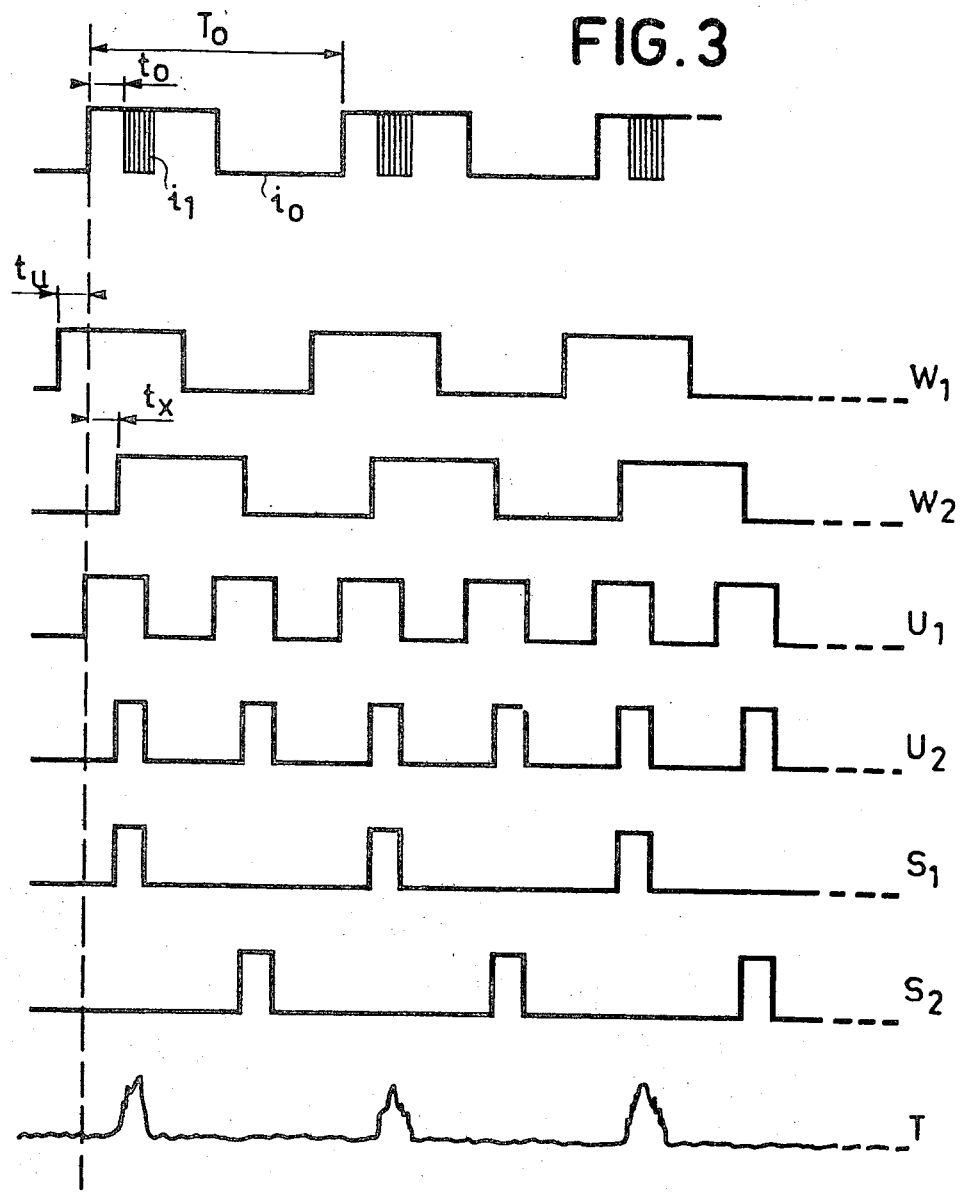
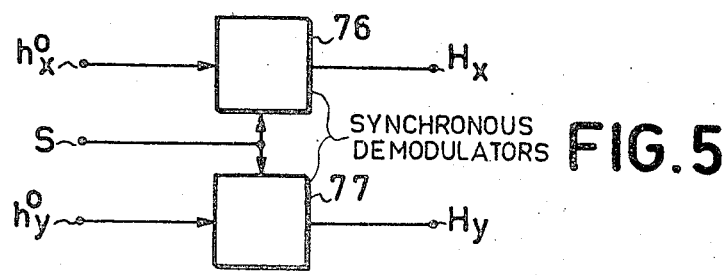

METHOD AND APPARATUS FOR POSITIONING A BOAT BY MONITORING THE MAGNETIC FIELD CREATED BY CURRENT CIRCULATING IN AN ELECTRIC CIRCUIT

BACKGROUND OF THE INVENTION

The present invention relates to the measurement of algebraic values of a magnetic field produced by an alternating current. This measurement is performed on a moving body to be positioned and which carries magnetometers.

The invention more particularly applies to the dynamic anchoring of a ship to a platform in the open sea. This platform has two conductors which are submerged in the water and through which pass in opposite directions an alternating current. The ship carries magnetometers, which measure the components of the instantaneous magnetic field in accordance with two axes Ox and Oy associated with the ship.

It is known from U.S. Pat. No. 4,316,253 to determine the relative signs of the components $h_x$ and $h_y$ of the magnetic field with respect to the moving axes Ox and Oy by a synchronous demodulation of one signal such as $h_x$ by the other signals such as $h_y$. It is possible to position the ship on the basis of the knowledge of the algebraic values of $h_x$ and $h_y$ and the course angle of the ship, when the chart of the magnetic values is known.

The synchronous demodulation of $h_y$ by $h_x$ produces an ambiguity at the start of the position measurement because, compared with the signs of the instantaneous current producing the magnetic field, the signs of $h_x$ and $h_y$ are not known. It is known to eliminate doubt by a rough position measurement.

BRIEF SUMMARY OF THE INVENTION

The present invention relates to a method for removing all doubt by magnetic field measurements and this has the advantage of permitting an automatic and precise positioning.

Briefly the present invention relates to a device for positioning a moving body in a horizontal plane indicated by the axes OX and OY, the moving body carrying magnetometers for measuring the magnetic field, produced by a vertical wire through which flows a current i, at the point of coordinates X and Y, wherein the current i is the sum of two currents $i_o$ and $i_1$, the said currents $i_o$ and $i_1$ corresponding to currents at frequencies $f_o$ and $f_1$, in which frequency $f_1$ called the high frequency is much higher than frequency $f_o$ called the low frequency and the current $i_1$ is modulated by recurring bursts of pulses having a recurring period $T_o$ each burst lasting less than $T_o/4$ in which $T_o = 1/f_o$, the moving body comprising two pairs of magnetometers, the first pair measuring the components of the magnetic field $h_x^o$ and $h_y^o$ along axes Ox and Oy associated with the moving body about frequency $f_o$ and the second pair of magnetometers measuring the components of these axes $h_x^1$ and $h_y^1$ about frequency $f_1$, on the basis of signals $h_x^o$, $h_y^o$, $h_x^1$, $h_y^1$ means make it possible to obtain a synchronous signal S of current $i_o$, the signal being used for demodulating the signals $h_x^o$ and $h_y^o$ thus supplying algebraic values of the magnetic field components.

BRIEF DESCRIPTION OF THE DRAWINGS

The invention is described in greater detail hereinafter relative to non-limitative embodiments and the attached drawings, wherein show:

FIG. 3 the characteristics of electrical signals used for removing the sign ambiguity for the measured magnetic fields.

FIG. 5 the demodulation diagram by signal S.

DETAILED DESCRIPTION OF THE PREFERRED EMBODIMENTS

Figure 1:
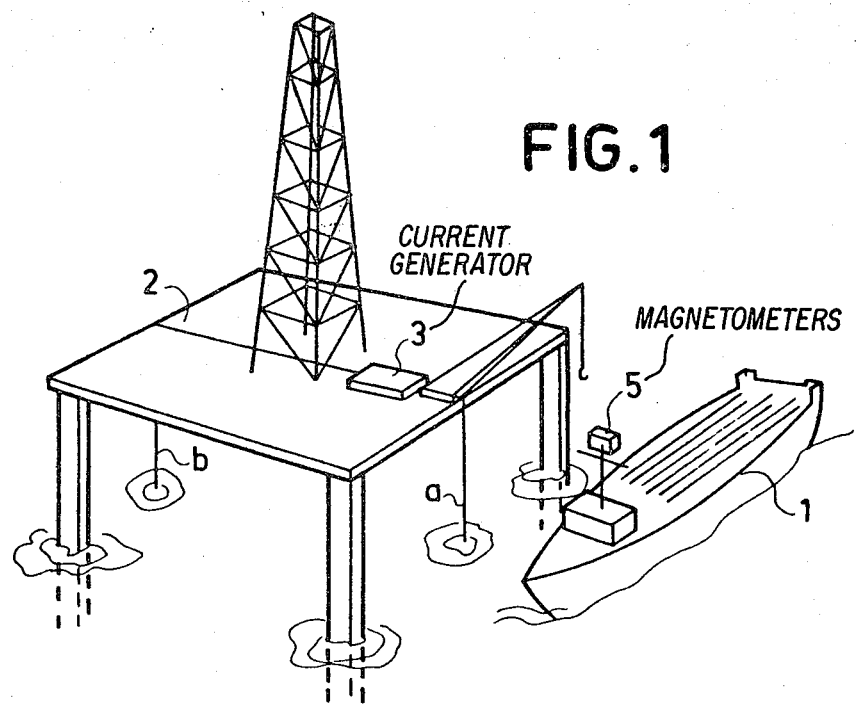
FIG. 1 the magnetic positioning of a ship at a platform.

FIG. 1 is a diagrammatic view of a dynamically anchored ship. Platform 2 has two conductors a and b, which are submerged in the water and are supplied by an alternating current generator 3, i being the instantaneous value of this current, which can have a sinusoidal time variation or preferably square signals at frequency $f_o$. An instantaneous magnetic field $\vec{h}$ in a plane orthogonal to the conductors a and b corresponds to said value of i of the conducting loop comprising said conductors. The components of this field $\vec{h}$ on the axes OX and OY of this plane are $h_x$ and $h_y$. The time variation of this field is the same as that of current i.

The positioning at one point of coordinates X and Y consists of determining these coordinates from algebraic values $h_X$ and $h_Y$, the sign of $h_X$ and $h_Y$ taking account of the algebraic value of current i, whereby for example a positive current is taken for direction OZ perpendicular to OX and OY for conductor a.

Ship 1 carries magnetometers 5, which measure the components of magnetic field $h_x$ and $h_y$ compared with axes x and y associated with the ship. It is these measured values and the course angle value which are used for controlling the dynamic anchoring of the ship.

Figure 2:
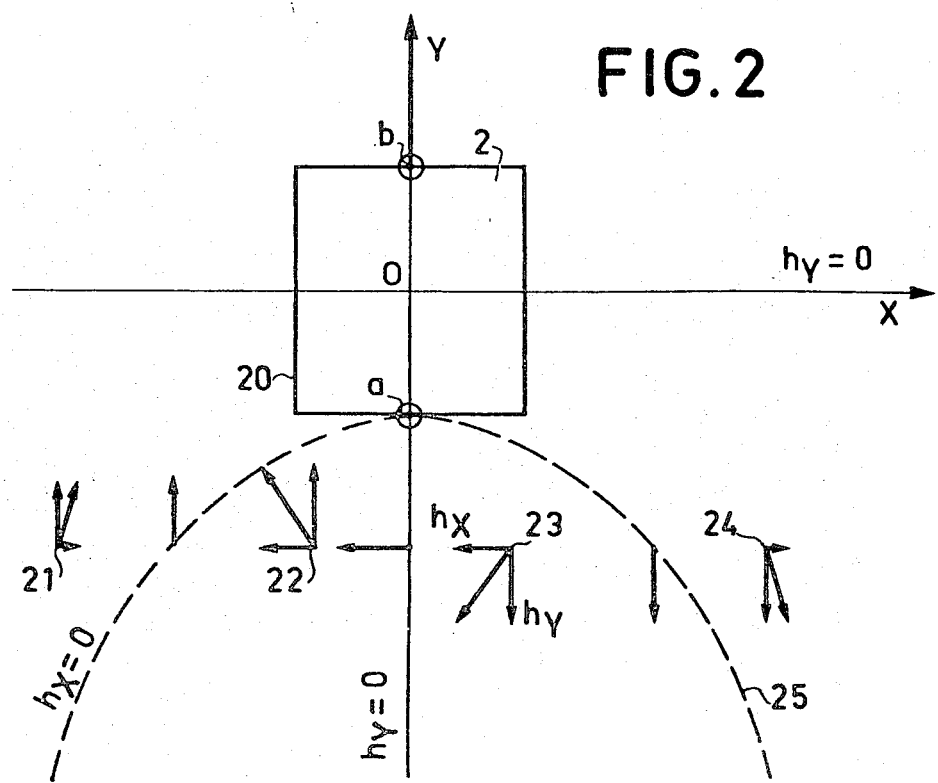
FIG. 2 a diagram showing the signs of the magnetic field components produced by two conductor wires traversed by a current in the plane OXY.

FIG. 2 diagrammatically shows the distribution of the magnetic field along its two components $h_x$, $h_y$ with respect to the instantaneous current i in the two conductors a and b. Reference is, for example, made to the "front" part 20 of the platform, which carries the conductor a.

Along axes OX and OY component $h_Y$ is zero, whilst along curve 25 component $h_X$ is zero. The signs of algebraic values $h_X$ and $h_Y$ thus determine four zones 21, 22, 23, 24 in plane OXY for $Y < O$ delimited by axes OX and OY and curve 25 in which $h_X$ is cancelled out. For example with the conventions used for the sign of instantaneous current i in zone 21 $h_X > O$ and $h_Y > O$, in zone 22 $h_X < O$ and $h_Y < O$, in zone 23 $h_X < O$ and $h_Y < O$ and finally in zone 24 $h_X > O$ and $h_Y > O$. Thus, there is an ambiguity on the signs of $h_X$ and $h_Y$, which occurs again on the signs of $h_x$ and $h_y$. The device according to the invention automatically and accurately removes this ambiguity.

Moreover, it is of interest to approach as closely as possible a magnetic field distribution produced by a single wire. Thus, in this case the intensity of the field decreases less rapidly with the distance. In addition, with reference to FIG. 2 the extent of zones 21 and 24 is decreased and the point where $h_X=0$ tends to become parallel to axis OX. For this purpose the two conductor wires a and b are placed level with the opposite edges of the platform so as to be as far away as possible, as shown in FIG. 1.

According to the invention the ambiguity on the signs of $h_x$ and $h_y$ is removed by introducing a current i into conductors a and b, said current consisting of superimposing an alternating current $i_o$ at frequency $f_o$, called the low frequency and an alternating current $i_1$ at frequency $f_1$, called the high frequency. Preferably $f_o$ is a few hundred Hertz and $f_1$ a few dozen kiloHertz.

Preferably the low frequency current $i_o$ has a time characteristic in square signals. The same applies with regards to the high frequency current $i_1$, but the latter is formed by square recurring bursts of pulses having a recurring period $T_o=1/f_o$, with each burst lasting less than $T_o/4$ and each of these pulses occurs within a quarter of a cycle of a low frequency current.

These high frequency pulses are used according to the invention for determining the sign of the low frequency current pulses, thus making it possible to find the signs of components $h_x$ and $h_y$. These signs are obtained by demodulating the signals supplied by magnetometers $h_x$ and $h_y$ through a signal obtained from the low frequency current.

According to the invention this low frequency current signal S is obtained from signals $h_x^o$, $h_y^o$, $h_x^1$ and $h_y^1$, $h_x^o$ and $h_y^o$ being supplied by a first pair of magnetometers supplying the components of the magnetic field $\vec{h}$ about frequency $f_o$, $h_x^1$ and $h_y^1$ being supplied by a second pair of magnetometers which supply the components of $\vec{h}$ at frequency $f_1$.

On the basis of these signals $h_x^o$ and $h_y^o$ a square pulse signal $U_1$ at frequency $2f_o$ is generated, the leading edges of every other pulse coinciding with the leading edges of the low frequency signal $i_o$. Signal $U_1$ makes it possible to obtain pulses $S_1$ and $S_2$ of width $T_o/8$ and frequency $f_o$, which will be used for comparison with the high frequency pulses T detected on the basis of signals $h_x^1$ and $h_y^1$.

The leading edge of signals $S_1$ is displaced by $T_o/8$ relative to signal $i_o$ and signals $S_2$ are displaced by $T_o/2$ relative to signals $S_1$.

FIG. 3 shows the time variation line i of currents $i_o$ and $i_1$ at frequencies $f_o$ and $f_1$. The leading edge of current $i_1$ is displaced by $t_o=T_o/8$ with respect to that of current $i_o$. The pairs of magnetometers which supply the components $h_x^o$, $h_y^o$ and $h_x^1$ and $h_y^1$ have narrow pass bands at $f_o$ and $f_1$ only permitting the passage of the fundamental frequencies.

The magnetometers used can, for example, be of the flux gate type, whose characteristics are adapted to the frequency to be detected.

Figure 4:
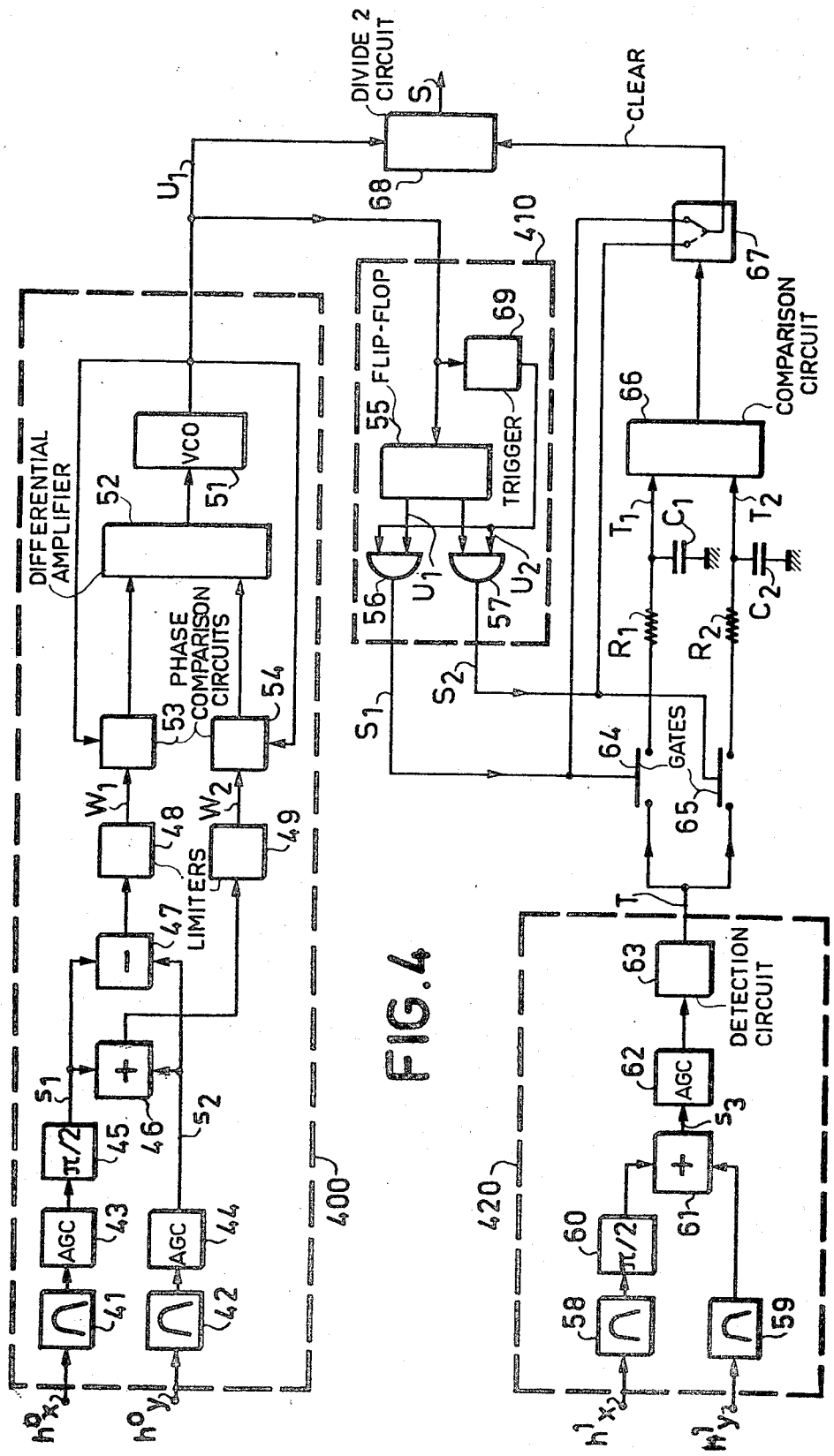
FIG. 4 the general diagram of circuits for generating, on the basis of the magnetic fields, a reference signal making it possible to determine the signs of the magnetic fields.

An embodiment of the device for removing ambituity in connection with the signs of magnetic fields according to the invention is shown in FIG. 4.

A first assembly 400 receives the signals $h_x^o$ and $h_y^o$ and supplies the signal $U_1$ at frequency $2f_o$, whose uneven leading edges coincide with signal $i_o$.

Signals $h_x^o$ and $h_y^o$ supplied by the pair of magnetometers are filtered at frequency $f_o$ by filters 41 and 42 and are applied to automatic gain control (AGC) devices 43, 44. The signal obtained from the first AGC 43 is applied to a 90° phase displacement circuit 45. The phase-displaced signal $s_1$ and signal $s_2$ at the output of the second AGC 44 are added and subtracted in circuits 46 and 47.

The phase-displaced signal $s_1$ is of form:

$$s_1 = H \cos(2\pi f_o t) \cdot \cos \Phi$$

and signal $s_2$ is of form:

$$s_2 = H \sin(2\pi f_o t) \cdot \sin \Phi$$

in which $\phi$ is the angle of magnetic field H with axis OX and H a constant proportional to the amplitude value of field $\vec{h}$.

After adding and subtracting signals $s_1$ and $s_2$ and clipping by circuits 48 and 49 square signals $W_1$ and $W_2$ (FIG. 3) are obtained, which are phase-displaced by $+\phi$ and $-\phi$ corresponding to advances and delays of the leading edges relative to signal $i_o$ of absolute value $t_\Phi$ with $t_\Phi = T_o \Phi / 2\pi$.

The two signals $W_1$ and $W_2$ are applied to a looped phase interlock circuit comprising an oscillator controlled by a voltage 51 or VCO (voltage control oscillator), which receives its control signal from a differential amplifier 52. At its two inputs amplifier 52 receives the algebraic values of differences between the rise times of signal $U_1$ and signals $W_1$ and $W_2$ supplied by circuits 53 and 54.

FIG. 3 shows signal $U_1$ at frequency $2f_o$ synchronized relative to signal $i_o$.

The synchronization of the VCO at a double frequency is necessary for preventing synchronization jumps during the rotation of the magnetometers, which can in fact vary freely.

The signals $U_1$ are used in a subassembly 410 for generating signals $S_1$ and $S_2$, which are used as comparison signals with the detected high frequency signal.

In subassembly 410 a circuit 69 firstly processes the square-wave signals $U_2$ (FIG. 3) of width $T_o/8$ and frequency $2f_o$. Signal $U_1$ is applied to a divisor by two flip-flop 55, whose complementary outputs are connected to one input of two AND-circuits 56, 57 receiving the signal $U_2$ at the other input. Thus, the two signals $S_1$ and $S_2$ shown in FIG. 3 are obtained.

Another subassembly 420 processes pulses T from the high frequency signals received. This subassembly receives the values of the magnetic field components $h_x^1$ and $h_y^1$ which are filtered at frequency $f_1$ by filtering circuits 58 and 59. These signals now only contain the fundamental frequency $f_1$. The signal corresponding to $h_x^1$ is phase-displaced by 90° by a circuit 60 and in a circuit 61 is added to the signal corresponding to $h_y^1$.

This addition supplies a signal $S_3$ proportional to H $\cos[(2\pi f_1 t - \phi)]$. Signal $S_3$ is applied to an automatic gain control circuit 62 and is detected by a circuit 63, thus supplying the pulses T shown in FIG. 3.

The position of the high frequency pulses detected is only very slightly dependent on the angle $\phi$, the time corresponding to a half cycle ($1/2f_1$) being very low. Therefore these pulses are relatively synchronous of signal $S_1$ or signal $S_2$.

Two gates 64 and 65 are controlled by signals $S_1$ and $S_2$ and receive signal T. The two output signals of the gates are then integrated by resistors and capacitors $R_1$, $R_2$, $C_1$, $C_2$ and the two signals $T_1$ and $T_2$ are compared in comparator 66.

At the output of the comparator, a signal equal to zero or 1 respectively is obtained if $T_1 < T_2$ and $T_1 > T_2$. The signals $S_1$ and $S_2$ are also transmitted to a switch 67 controlled by the output signal of comparator 66 and which supplies $S_1$ or $S_2$, as a function of whether the input signal is 1 or 0 respectively.

Signal $U_1$ is transmitted to a divisor by two circuit 68, whose resetting is supplied by the output signal of the switch making it possible to obtain the low frequency signal of frequency $f_o$ with an ambiguity-free phase. This signal S is now used for demodulating the various signals $h_x^o$ and $h_y^o$, which will then be known with their sign.

Signal S supplied by the divisor circuit by two 68 is used for the demodulation of signals $h_x^o$ and $h_y^o$, as shown in FIG. 5.

The synchronous demodulation circuits 76 and 77 respectively receive signals $h_x^o$ and $h_y^o$ from the pair of low frequency magnetometers. The demodulation is obtained by signal S. In this way the algebraic values of the amplitudes of the magnetic field components $H_x$ and $H_y$ are obtained. These values are used in the circuits for calculating coordinates used for positioning purposes.

Thus, an improvement has been described in connection with the positioning of a moving body by a magnetic field obviating the need to use approximate direct position measurements.

What is claimed is:

1. A device for positioning a moving body in a horizontal plane indicated by the axes OX and OY, the moving body carrying magnetometers for measuring the magnetic field, produced by a vertical wire through which flows a current i, at the point of coordinates X and Y, wherein the current i is the sum of two currents $i_o$ and $i_1$, the said currents $i_o$ and $i_1$ corresponding to currents at frequencies $f_o$ and $f_1$, in which frequency $f_1$ called the high frequency is much higher than frequency $f_o$ called the low frequency and the current $i_1$ is modulated by recurring burst of pulses with a recurring period $T_O$, each burst lasting less than $T_o/4$ in which $t_O=1/f_O$, the moving body comprising two pairs of magnetometers, the first pair measuring the components of the magnetic field $h_x^o$ and $h_y^o$ along axes Ox and Oy associated with the moving body at frequency $f_o$ and the second pair of magnetometers measuring the components of these axes $h_x^1$ and $h_y^1$ at frequency $f_1$, means for providing a signal S synchronous with current $i_o$, means for demodulating the signals $h_y^o$ and $h_y^o$ by utilizing said signal S thus supplying algebraic values of the magnetic field components.

2. A positioning device according to claim 1, wherein the current $i_o$ at frequency $f_o$ has a time variation in square signals and the current $i_1$ at frequency $f_1$ has a time variation in square pulses.

3. A positioning device according to claim 2, wherein the signals supplied by the first pair of magnetometers $h_x^o$ and $h_y^o$ are filtered in filters centered around $f_o$, regulated by automatic gain control circuits, the signal corresponding to $h_x^o$ being phase-displaced by 90° by a phase-displacing means and added and subtracted to a signal corresponding to $h_y^o$ in addition and subtraction circuits, the added and subtracted signals being clipped by circuits supplying square signals $W_1$ and $W_2$ phase-displaced by $+\phi$ and $-\phi$, in which $\phi$ is the magnetic field angle with the axis Ox and the signals $W_1$ and $W_2$ are applied to means supplying a signal $U_1$ of square signals of frequency $2f_o$ synchronous with signal $i_o$.

4. A positioning device according to claim 3, wherein the means for generating signal $U_1$ comprise an oscillator controlled by a voltage controlled by an output signal of a differential amplifier and two comparators, which compare the rise times of signals $W_1$ and $W_2$ with the rise time of the signal supplied by the oscillator, said comparators supplying the two input signals of the differential amplifier and on the basis of signal $U_1$ make it possible to generate square-wave pulses $S_1$ and $S_2$ of recurrence $T_o$ of pulse width $T_o/8$ and displaced by $T_o/2$, the leading edges of $S_1$ being displaced by $T_o/8$ with respect to that of signal $i_o$.

5. A positioning device according to claim 1, wherein the magnetic field components $h_x^1$ and $h_y^1$ are filtered by filters centered at $f_1$, the signal corresponding to $h_x^1$ is phase-displaced by 90° by a phase-displacement means, the phase-displaced signal is added to that corresponding to $h_y^1$ in an addition circuit, regulated in an automatic gain control circuit and detected in a detection circuit supplying signals T.

6. A positioning device according to claim 4 or 5, further comprising two gates controlled by signals $S_1$ and $S_2$ and receiving the signal T, the two output signals of the two gates being integrated and compared in a comparator, the output signal of the comparator controlling a switch receiving the two signals $S_1$ and $S_2$ and the output signal of said comparator $S_1$ or $S_2$ effecting a resetting of a divisor by two circuit, which receives the signal $U_1$ and supplies the restored signal S.

7. A process for obtaining the position of a boat comprising the steps of;
generating a current circulating in an electric circuit which current is the sum of a first current $i_o$ and a second current $i_1$ with said first current being an AC square shape current having a low frequency $f_o$ and a period $T_o=1/f_o$ and wherein said second current consists of square pulses of high frequency current with said high frequency having a value $f_1$, said value being greater than $f_O$, and wherein said pulses are produced in bursts with said bursts having a recurring period $T_o$ and wherein the duration of each of said bursts is less than $T_o/4$ and further wherein each of said bursts is generated in a fixed quarter of the period of said first current;
monitoring from said boat the magnetic field components created by the currents $i_o$ and $i_1$ of said current circulating in said electric circuit, and determining the position of said boat from said monitored magnetic field components.

8. A process as claimed in claim 7 wherein the ratio of frequency between said high frequency $f_1$ and said low frequency $f_O$ is substantially 10.

9. A process as claimed in claim 7 wherein the leading edge of each of said bursts is displaced from the leading edge of said first current by $T_O/8$.

10. A process as claimed in claim 7 wherein said magnetic field which is monitored includes components at low frequency $f_O$ and components at high frequency $f_1$, with said low frequency components being monitored to produce a first signal $U_1$ at frequency $2f_O$ in phase with said first current and wherein said high frequency components are monitored to produce a second signal T at a frequency $f_O$ marking the fixed quarter of the period of said first current comprising said pulses and wherein said first signal is frequency divided by two under the control of said second signal for producing a demodulated signal S synchronous with said first current.

11. An apparatus for monitoring the magnetic field created by a current circulating in an electric circuit, said magnetic field having two components $h_x^o$ and $h_y^o$ of low frequency $f_o$, and two components $h_x^1$ and $h_y^1$ of high frequency $f_1$, said apparatus comprising:
a first pair of magnetometers for detecting said components $h_x^o$ and $h_y^o$;

a first phase-shifter for shifting the signal of one of said magnetometers by 90°;

first means for adding said shifted signal with the signal of the other one of said first magnetometers and delivering a first square signal $W_1$ having a frequency $f_o$ and a phase lead $+\phi$;

means for subtracting from said shifted signal the signal of the other one of said magnetometers and delivering a second square signal $W_2$ having a frequency $f_o$ and a phase lag $-\phi$;

a voltage control oscillator for delivering a third square signal $U_1$ having a frequency $2f_o$ and no phase shift;

two phase comparison circuits for comparing respectively said first and second square signals $W_1$ and $W_2$ to said third square signal $U_1$;

a differential amplifier for receiving the signals of said phase comparison circuits and controlling said voltage control oscillator;

a flip-flop divider for dividing by two said third square signal, having two complementary output;

a trigger for receiving said third square signal and delivering a first rectangular signal $U_2$ phased with said third square signal and having a frequency $2f_o$;

two AND gates connected respectively to the complementary outputs of said flip-flop divider and to the output of said trigger, for respectively selecting one of two successive periods of said first rectangular signal and delivering respectively a second $S_1$ and a third $S_2$ rectangular signal having a frequency $2f_o$ and having opposite phases;

a second pair of magnetometers for detecting said components $h_x^1$ and $h_y^1$;

a second phase-shifter for shifting the signal of one of said second magnetometers by 90°;

second means for adding this shifted signal with the signal of the other one of said second magnetometers;

means for detecting the signal delivered by said second adding means and delivering a detected pulse signal T;

two gates for gating said detected pulse signal under the control of respectively said second and third rectangular signals;

two integrators respectively connected to the outputs of said two gates;

a comparator connected to the outputs of said two integrators;

a commutator for selecting one of said second and third rectangular signals under the control of said comparator;

a divider for dividing by two said third square signal under the control of the one of said second and third rectangular signal selected by said commutator, and delivering a fourth square signal S synchronous and phased with the field-creating current.

12. An appartaus as claimed in claim 11, further comprising two synchronous demodulating circuits for demodulating said components $h_x^1$ and $h_y^1$ under the control of said fourth square signal, and delivering the algebraic values of the low frequency components of said magnetic field.

* * * * *